3,402,196
ORGANOPHOSPHORUS COMPOUNDS AND METHODS FOR THE PREPARATION THEREOF

Bobby F. Dannels and Alvin F. Shepard, Grand Island, N.Y., assignors to Hooker Chemical Corporation, Niagara Falls, N.Y., a corporation of New York
No Drawing. Continuation-in-part of application Ser. No. 220,901, Aug. 31, 1962. This application Nov. 16, 1967, Ser. No. 683,463
11 Claims. (Cl. 260—502.4)

ABSTRACT OF THE DISCLOSURE 3,5-di-alkyl (and cycloalkyl)-4-hydroxyphenylphosphonous (and phosphinous) acids are new compounds, useful to stabilize organic materials, such as lubricants, hydrocarbons, fuels, and plastics against oxidation and the effects of light and heat. Methods for manufacture of such compounds by reaction of 2,6-dialkyl (and cyclohexyl) phenols with a phosphorus trihalide in the presence of a tertiary amine and subsequent hydrolysis of the product made are also described.

---

This application is a continuation-in-part of our co-pending application Ser. No. 220,901, filed Aug. 31, 1962, and now abandoned.

This invention relates to organophosphorus compounds. More particularly, it relates to hydroxyphenylphosphonous and hydroxyphenylphosphinous acids and methods for the preparation thereof.

Various types of aromatic phosphonous acids and bis-aromatic phosphinous acids are known to the art. Most of these, however, require the use of aluminum chloride as a catalyst in their preparation. This catalyst, apart from contributing to the cost of the synthesis, complicates the recovery of the product. The complications which are involved in recovery of the product from the aluminum chloride catalyst are set forth on pages 44 and 128 of Kosolapoff's "Organo-Phosphorus Compounds," Second Edition (1958), published by John Wiley & Sons, Inc.

Therefore, an object of this invention is to provide a method of preparing organo-phosphonous acids and organo-phosphinous acids without a catalyst.

Another object of this invention is to provide novel hydroxyphenylphosphonous acids.

A further object of this invention is to provide novel bis(hydroxyphenyl)phosphinous acids.

Still further objects and the scope of applicability of the present invention will be come apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has been found that novel hydroxyphenylphosphonous acids and novel bis(hydroxyphenyl)phosphinous acids can be prepared by reacting a substituted phenol with a phosphorus trihalide, in the presence of a halogen acid acceptor, such as an amine, preferably a tertiary amine.

The temperature and pressure at which the reaction of this invention is carried out are dictated largely by convenience and depend upon the boiling point of phosphorus trihalide. Thus, the boiling point of phosphorus trichloride is 76 degrees centigrade and to react this composition much above 76 degrees centigrade would require pressure equipment. However, subatmospheric and superatmospheric pressures can be used if desired. The reaction is preferably carried out at a temperature of from about ten degrees centigrade to about 25 degrees centigrade without the presence of a catalyst.

The reaction is completed when, in the presence of a tertiary amine, a precipitate no longer continues to form. Another way to test for completion of the reaction is to test for the halide and determine that the evolution of halogen acid is complete. The halogen halide by-product of the reaction may then be separated by evaporation in instances where a tertiary amine is not utilized. The other remaining volatile by-products are removed by distillation at reduced pressure, leaving a residue. The desired product is then removed from the residue by hydrolysis and crystallization of the resulting solids.

It has been further found that both products of this invention may be obtained; i.e., a hydroxyphenylphosphonous acid and a bis(hydroxyphenyl)phosphinous acid, from the same reaction mixture. The relative amounts of each, however, may be varied by varying the molecular ratio of the reactants. For example, if a hydroxyphenylphosphonous acid is the desired product, then one mole of substituted phenol may be reacted with an excess of the phosphorus trihalide, and if the bis(hydroxyphenyl)phosphinous acid is desired, one mole of phosphorus halide can be reacted with an excess of the substiuted phenol.

The hydroxyphenylphosphonous acids may be separated from the bis(hydroxyphenyl)phosphinous acids by means of their difference in acidity. The hydroxyphenylphosphonous acid, being a strong monobasic acid, readily forms water-soluble sodium salts whereas the bis(hydroxyphenyl)phosphinous acid, being an extremely weak acid, shows little acidity, except in a non-aqueous medium. Thus, in consequence, it does not dissolve appreciably in dilute aqueous caustic and may be separated from the hydroxyphenylphosphonous acid. The latter forms a soluble sodium salt and the former remains as an insoluble residue in the aqueous caustic.

Although phosphorus trichloride is preferred for the purpose of illustration, it is to be understood that phosphorus triiodide, tribromide, and trifluoride may also be used in suitable reactions. Metal halides and other halides may also be used in the practice of this invention, such as the halides of antimony, arsenic, silicon and boron.

The substituted phenols which may be used in this invention have the general formula:

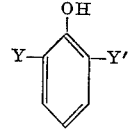

wherein Y and Y' are organic radicals containing at least one carbon atom.

For purposes of this invention 2,6-t-butyl phenol is reacted with phosphorus trichloride. However, other 2,6-di-lower alkyl phenols may be used, such as 2,6-dimethyl phenol, 2,6-diethyl phenol, 2,6-diisopropyl phenol, 2-ethyl-6-secondary butyl phenol, dicyclohexyl phenol, and lower alkyl substituted cyclohexyl phenol. Usually the alkyl groups Y and Y', which may be the same or different, are lower alkyl, of 1 to 10 carbon atoms each and preferably are of 1 to 6 carbon atoms each. Tertiary alkyls, such as t-butyl, are also preferred. The new hydroxyphenylphosphonous and bis(hydroxyphenyl) phosphinous acids formed by the reaction of this invention have the general formula:

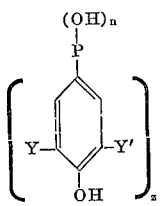

wherein Y and Y' are organic radicals containing at least one carbon atom and $n$ and $z$ are integers from 1 to 2, $z$ being 2 when $n$ is 1 and 1 when $n$ is 2.

Some examples of the products formed by the process of this invention are 3,5-dimethyl-4-hydroxyphenylphosphonous acid; bis(3,5-dimethyl-4-hydroxyphenyl)phosphinous acid; 3,5-diethyl-4-hydroxyphenylphosphonous acid; bis(3,5-diethyl-4-hydroxyphenyl) phosphinous acid; 3,5-diisopropyl-4-hydroxyphenylphosphonous acid; bis (3,5-diisopropyl-4-hydroxyphenyl)phosphinous acid; 3-ethyl-5-secondary butyl-4-phenylphosphonous acid; bis(3-ethyl - 5 - secondary butyl-4-hydroxyphenyl)phosphinous acid; 3,5-dicyclohexyl-4-hydroxyphenylphosphonous acid; and bis(3,5 - dicyclohexyl-4-hydroxyphenyl)phosphinous acid.

The products of this invention, i.e., the hydroxyphenyl phosphonous and bishydroxyphenylphosphinous acids are useful as inhibitors, stabilizers, antioxidants, lubricant additives and as biologically active materials. Thus, they may be used to stabilize hydrocarbon materials, such as lubricants and fuels and inhibit oxidation thereof, even when employed only to the extent of from .01 percent to 1 percent of the compositions. Preferably, from 0.05 to 0.5 percent of the products of this invention are employed. They are similarly useful as stabilizers in plastics, such as polyvinyl chloride, and in monomers for use in plastics, such as styrene.

The following examples illustrate ways in which the invention has been practiced and the advantages accruing therefrom.

Example 1.—Preparation of 3,5-di-t-butyl-4-hydroxyphenylphosphonous acid

A mixture of 413 grams of 2,6-di-t-butylphenol and 273 grams of triethylamine was added dropwise to 1005 grams of $PCl_3$ in a vessel from which moisture was excluded. Addition time was 2¾ hours. The temperature was maintained at 10 to 20 degrees centigrade. After removal of the solid amine hydrochloride, unreacted reagents and by-products were removed by distillation at 1 mm. of mercury absolute pressure. The residue, amounting to 269 grams, was then ground up. A 100-gram portion of it was suspended in 1 liter of water containing 40 grams of NaOH. This was boiled for three hours and steam volatile material was distilled off. Upon cooling, a crystalline material separated. This was filtered off, washed with ether and dried; 82 grams were obtained. It was then recrystallized twice from water. The free acid was obtained by acidification with dilute HCl. After crystallization from a methanol water mixture, it melted at 145 to 146 degrees centigrade, and had the following analysis:

Calculated for $C_{14}H_{23}O_3P$: C, 62.0%; H, 8.5%; P, 11.4%. Found: C, 62.3%; H, 8.7%; P, 11.5%.

The material is a strong monobasic acid. The presence of the phenolic OH group was proven by a non-aqueous titration and by infrared spectra. Thus, it was established to be 3,5-di-t-butyl-4-hydroxyphenyl phosphonous acid.

Example 2.—Preparation of bis(3,5-di-t-butyl-4-hydroxyphenyl) phosphinous acid

A mixture of 412 grams of 2,6-di-t-butylphenol and 267 grams of triethylamine was added dropwise to 1012 grams of $PCl_3$ over a 2¼ hour period at 22 to 25 degrees centigrade. The reaction mixture was protected from moisture. The solid amine hydrochloride was filtered off and the unreacted reagents and the 2,6-di-t-butyl-phenyl phosphorodichloridite were then distilled off.

The residue, which weighed 230 grams, was ground up and added to 1.1 liters of 10 percent aqueous sodium hydroxide. This mixture was boiled for two and one-half hours. Steam volatile material was distilled off. The portion of residue which was not completely soluble in the hot basic solution was filtered off, washed with acetone and dried; 43.5 grams were obtained. After purification by crystallizing from benzene, it melted at 207 to 208 degrees centigrade, and had the following analysis:

Calculated for $C_{28}H_{43}O_3P$: C, 73.3%; H, 9.37%; P, 6.8%. Found: C, 73.8%; H, 9.6%; P, 7.0%.

The compound reacts neutral in water. The presence of the phenolic OH groups was proven by a non-aqueous titration and by its infrared spectrum. Thus, it was established as being bis(3,5-di-t-butyl-4-hydroxyphenyl)phosphinous acid.

Example 3.—Antioxidant effects

The compounds which were made in Examples 1 and 2 were tested as peroxidation inhibitors and as stabilizers. As is shown by the following table, triisopropyl benzene was tested for hydroperoxide production after 48 hours in air at 100 degrees centigrade, without any additive; with 0.1 percent of a known antioxidant (2,6-di-t-butylphenol); and with 0.1 percent of the compounds of Examples 1 and 2.

TABLE

| | Percent hydroperoxide present after 48 hours in air at 100 degrees centigrade |
|---|---|
| Triisopropyl benzene, alone | 17.00 |
| Triisopropyl benzene plus 0.1 percent 2,6-di-t-butylphenol | 0.08 |
| Triisopropyl benzene plus 0.1 percent 3,5-di-t-butyl-4-hydroxyphenyl phosphonous acid | 0.05 |
| Triisopropyl benzene plus 0.1 percent bis(3,5-di-t-butyl-4-hydroxyphenyl) phosphinous acid | 0.03 |

The results of this test prove that the compounds of this invention are useful antioxidants when tested against a typical aromatic compound found in normally peroxidizable hydrocarbon motor fuels.

Example 4.—Stabilizing effects

The compounds of this invention were also tested for their stabilizing utility. Styrene monomer, when exposed to direct sunlight for 20 hours, solidifies. If unexposed to sunlight, the styrene monomer remains liquid. In the presence of 0.05 percent of 3,5-di-t-butyl-4-hydroxyphenyl phosphonous acid, even after being exposed to sunlight for 20 hours, the styrene monomer is no more viscous than unexposed material.

When the present phosphonous and phosphinous acids are employed as heat stabilizers in polyvinyl chloride, they are also effective at 0.25 part concentration in 50 parts of polyvinyl chloride, by weight, 22 parts dioctyl phthalate and 4 parts of barium cadmium laurate. In ultraviolent radiation exposure tests, after 123 hours' exposure, polyvinyl chloride containing such a very small proportion of bis(3,5-di-t-butyl-4-hydroxyphenyl) phosphinous acid, only turned light yellow, but a control, without the phosphinous acid, became gray.

In addition to their utility for peroxidation inhibition of organic compounds, especially unsaturated hydrocarbons, and their stabilizing effect on unsaturated compounds such as organic monomers and plastics, the new phosphonous and phosphinous acids are also useful chemical intermediates for the syntheses of other substances. Thus, when oxidized in acid medium, both 3,5-di-t-butyl-4-hydroxyphenyl phosphonous acid and the corresponding bis-phosphinous acid yield the related phosphonic acids, while in alkaline medium the phosphonous acid yields a highly colored substance, 3,3',5,5'-tetra-t-butyl diphenyl quinone. Similar results are obtained with the other alkyl-substituted phosphonous and phosphinous acids of this invention.

What is claimed is:
1. A composition having the general formula:

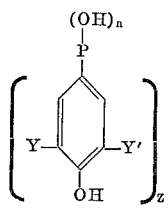

wherein Y and Y' are organic radicals selected from the group consisting of lower alkyl and cyclohexyl, and $n$ and $z$ are from 1 to 2, $z$ being 2 when $n$ is 1 and 1 when $n$ is 2.

2. A composition according to claim 1 wherein Y and Y' are tertiary alkyl groups.

3. A compound according to claim 2 wherein $n$ is 2 and Y and Y' are tertiary butyl.

4. A compound according to claim 2 wherein $n$ is 1 and Y and Y' are tertiary butyl.

5. A process for preparing an organophosphorus acid having the formula:

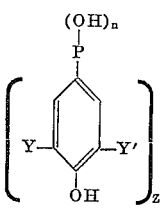

wherein Y and Y' are organic radicals selected from the group consisting of lower alkyl and cyclohexyl, and $n$ and $z$ are from 1 to 2, $z$ being 2 when $n$ is 1 and 1 when $n$ is 2, comprising reacting a phenol having the formula:

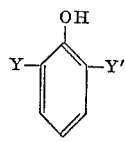

wherein Y and Y' are as described above, with a phosphorus trihalide in the presence of a tertiary amine, distilling off the by-product formed to recover a residue, hydrolyzing said residue, and thereafter separating the desired product.

6. A process in accordance with claim 5 wherein Y and Y' are tertiary butyl groups and the reaction of the phenol is with phosphorus trichloride under anhydrous conditions.

7. A process in accordance with claim 6 wherein the product is a hydroxyphenyl phosphonous acid.

8. A process in accordance with claim 6 wherein the product is a hydroxyphenyl phosphinous acid.

9. The process of claim 7 wherein the hydroxyphenyl phosphonous acid is 3,5-di-t-butyl-4-hydroxyphenyl phosphonous acid.

10. The process of claim 8 wherein the hydroxyphenyl phosphinous acid is bis(3,5-di-t-butyl-4-hydroxyphenyl) phosphinous acid.

11. A process for preparing an organophosphorus acid having the formula:

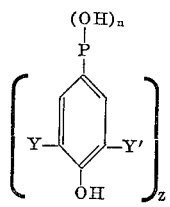

wherein Y and Y' are selected from the group consisting of lower alkyl and cyclohexyl, $n$ and $z$ are integers from 1 to 2, $z$ being 2 when $n$ is 1 and 1 when $n$ is 2, comprising reacting a phenol having the formula:

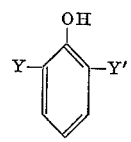

wherein Y and Y' are as described above, with a phosphorus trihalide in the presence of a tertiary amine, separating the reaction product from the reaction mixture, and acidifying such reaction product to form the desired organo-phosphorus acid.

References Cited

UNITED STATES PATENTS

| 2,683,168 | 7/1954 | Jensen et al. | 260—543 |
| 3,183,264 | 5/1965 | Rochlitz et al. | 260—543 |
| 3,210,418 | 10/1965 | Pianfetti | 260—543 |

OTHER REFERENCES

Kosolapoff: "Organophosphorus Compounds" (1950), pp. 182, 183, 189.

Van Wazer: "Phosphorus and Its Compounds," vol. 1 (1958), pp. 370, 373.

BERNARD HELFIN, *Primary Examiner.*

J. E. EVANS, *Assistant Examiner.*